United States Patent [19] [11] 3,994,813
Meier [45] Nov. 30, 1976

[54] ROTARY PLATE FILTER APPARATUS
[75] Inventor: Hanspeter Meier, Rapperswil, Switzerland
[73] Assignee: Hans Müller, Maennedorf, Switzerland
[22] Filed: June 11, 1975
[21] Appl. No.: 585,807

[30] Foreign Application Priority Data
June 21, 1974  Switzerland............... 8652/74

[52] U.S. Cl. ............................. 210/330; 210/344; 210/345
[51] Int. Cl.² ........................................ B01D 33/26
[58] Field of Search ........................... 210/323–325, 210/330–332, 344, 345, 359, 486, 487

[56] References Cited
UNITED STATES PATENTS
3,033,373  5/1962  Mueller.............................. 210/344
3,142,642  7/1964  Kracklauer ..................... 210/344 X
3,187,899  6/1965  Prizler............................. 210/487 X
3,662,894  5/1972  Bockler............................ 210/344 X
3,931,017  1/1976  Schulte et al................... 210/344 X FOREIGN PATENTS OR APPLICATIONS
527,387  4/1954  Belgium.............................. 210/486

Primary Examiner—Frank W. Lutter
Assistant Examiner—William A. Cuchlinski, Jr.
Attorney, Agent, or Firm—Michael J. Striker

[57] ABSTRACT

A hollow upright shaft is surrounded at axially spaced locations by spacer rings. Intermediate these rings the shaft is surrounded by substantially horizontally oriented plate-shaped filter elements which rotate with the shaft. Each filter element has a liquid-impermeable annular plate the upper surface of which carries a filter material. The inner circumference of the plate is formed with a downwardly extending stepped collar which is received in the subjacent spacer ring and thus centers the filter element with reference to the ring and to the shaft. The latter has openings in its periphery through which filtered liquid can flow into the interior of the shaft, to be led away.

5 Claims, 2 Drawing Figures

U.S. Patent    Nov. 30, 1976    3,994,813

ROTARY PLATE FILTER APPARATUS

BACKGROUND OF THE INVENTION

This invention relates to the filtration of liquids, and in particular to filtering apparatus of the type using rotary filter plates.

It is known to provide such apparatus where annular plate-shaped filter elements are mounted on a rotatable upright shaft in a substantially horizontal orientation. The substance to be filtered is admitted onto the upper surfaces of the filter elements which are provided with filter cloth of e.g. textiles, synthetic plastics or metal. The liquid component runs through the filter cloth onto the underlying liquid-impermeable plate of the filter element and from there runs through openings in the wall of the shaft into the interior of the latter, to be led away.

The matter retained in or on the filter cloth forms a filter cake. When the filtration is completed, or when the filter cake has reached a certain thickness, the heretofore stationary shaft is rotated and, as the filter elements rotate with it, the filter cake is flung off the filter elements due to the influence of centrifugal force.

The individual vertically spaced filter elements are maintained at the desired spacing by interposed spacing rings which surround the shaft.

To avoid difficulties in operation, e.g. the development of severe vibrations during rotation of the shaft and elements, it is important that the filter elements be properly centered with reference to the shaft and to one another, and that this centered relationship be maintained at all times. One prior art proposal suggests for this purpose a rather complicated arrangement which, although it is effective, is also expensive and therefore undesirably increases the manufacturing and selling costs of the apparatus, respectively the filter elements therefore.

SUMMARY OF THE INVENTION

It is an object of the invention to overcome this disadvantage of the prior art.

More especially, it is an object of the present invention to provide an improved apparatus of the type under discussion, wherein the centering of the filter elements is reliably effected and maintained in a simple and inexpensive manner.

In keeping with these objects, and with others which will become apparent hereafter, one feature of the invention resides, in a rotary plate filter apparatus, in a combination comprising a hollow upright shaft, annular filter elements surrounding said shaft at vertically spaced locations and each including a liquid-impermeable support plate having an inner circumference formed with a downwardly extending stepped collar, and an upper surface which supports a filter material. Spacing rings surround the shaft intermediate the filter elements and each of these spacing rings has an inner diameter dimensioned to centeringly receive the stepped collar of the respectively superjacent support plate.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
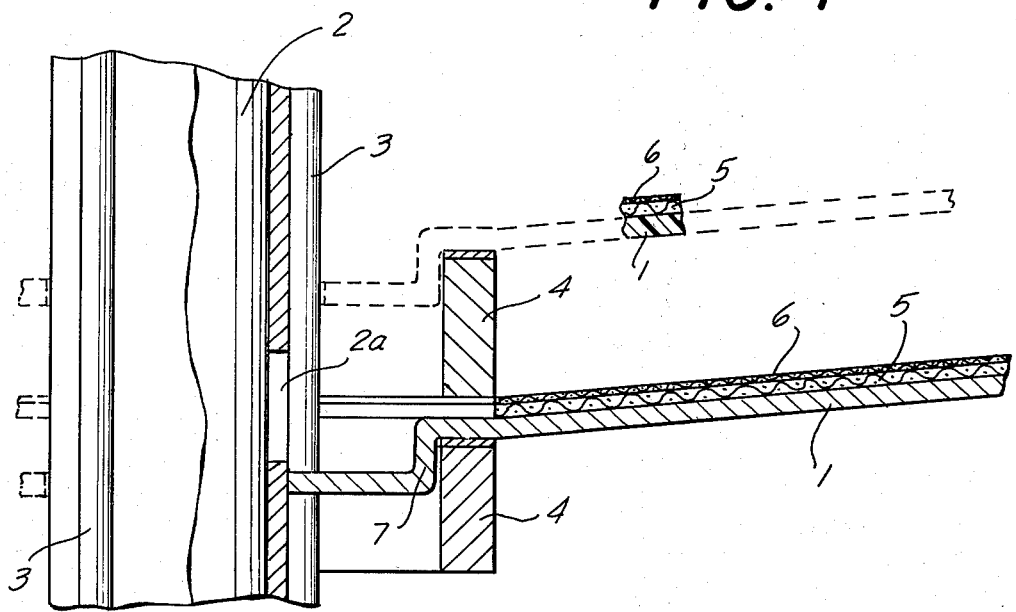
FIG. 1 is a section taken on line I—I of FIG. 2.
Figure 2:
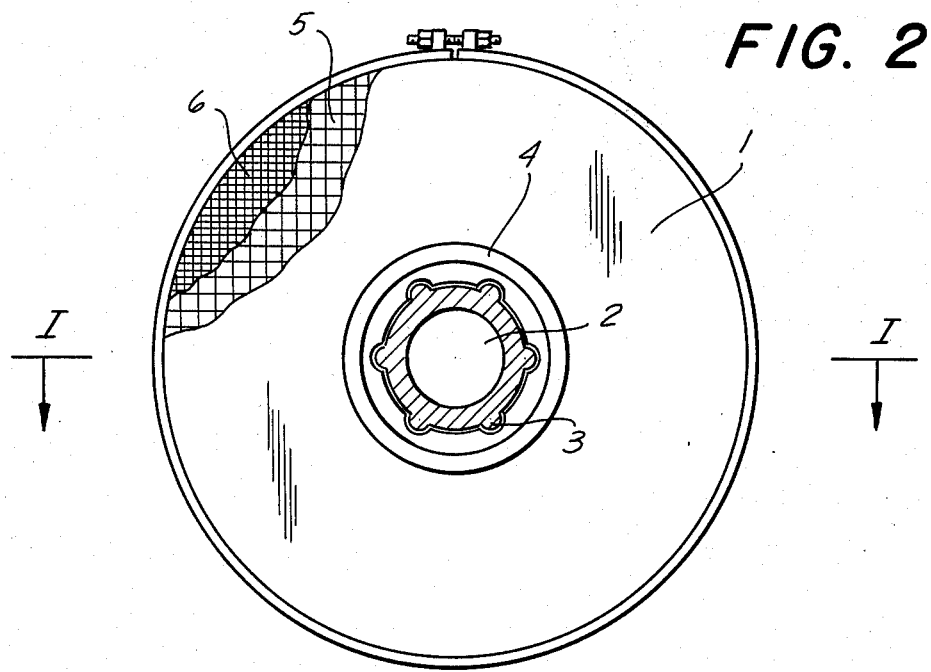
FIG. 2 is a top-plan view of FIG. 1, with portions broken away for purposes of illustration.

No specific details of the filter apparatus have been illustrated in FIGS. 1 and 2, other than those needed for an understanding of the invention. The basic apparatus and its operation are known in the art, for example from U.S. Pat. Nos. 3,233,734 and 3,292,791, to which reference may be had for further information.

In keeping with the teachings of these patents the apparatus of the present invention has an upright shaft 2 which is hollow and which is formed in its wall with a plurality of openings 2a (one shown) for the entry of filtered liquid into the interior of the shaft 2, from whence the liquid is guided away. The shaft 2 is rotatable about its upright axis, in the manner disclosed in the aforementioned patents.

Annular filter elements surround the shaft 2 at vertically spaced locations. Each of these elements is composed of a liquid-impermeable filter plate 1 which carries on its upwardly directed surface a coarse filter support structure, such as a coarse mesh material 5. The plate 1 may be of metal or synthetic plastic, as shown in the drawing. In turn, the structure 5 supports a fine-mesh filter cloth 6 which retains the solid phase of a liquid-solid suspension which is guided onto the filter cloth 6, so that the liquid phase is filtered as it travels through the filter cloth 6. The plates 1 are advantageously downwardly conical, as shown in FIG. 1, to allow the filtered liquid to run off toward the shaft 2 and to enter into a respective opening 2a.

According to the invention, the inner circumference of each plate 1 is formed with a downwardly extending stepped annular collar 7 which is so dimensioned as to just fit into a subjacent one of the spacing rings 4 which surround the shaft 2 intermediate the filter elements. The spacing between each plate 1 and the spacing ring 4 is small, e.g. 0.5 mm, so that only very slight play is possible during the rotation of the shaft 2.

The shaft 2 is provided with outward projections 3 which inter-engage with cooperating recesses in the inner periphery of the respective plate 1 so as to prevent relative rotation of the shaft 2 and plate 1.

The invention makes it possible to eliminate the prior-art centering arrangements for the filter elements and permits the use of very simple spacing rings 4 of unobstructed inner cross-section. Welded or otherwise affixed projections on the spacing rings, extending towards the shaft 2 and serving to center the rings and filter elements, are no longer necessary and therefore the construction of the apparatus is simplified and the manufacturing and selling costs are reduced. Also, the prior-art possibility that some of the openings 2a might become partly or fully closed by the presence of centering projections, is now avoided.

It will be understood that each of the elements described above, or two or more together, may also find a useful application in other types of constructions differing from the types described above.

While the invention has been illustrated and described as embodied in a rotary plate filter apparatus, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. In a rotary plate filter apparatus, a combination comprising a hollow upright shaft having a plurality of radial openings through the wall thereof; annular filter elements surrounding said shaft at vertically spaced locations and each including a liquid-impermeable support plate having an inner circumference formed with a downwardly extending stepped collar defining an annular chamber communicating with a respective one of said openings, and an upper surface which supports a filter material comprising a fine mesh filter cloth and a coarse mesh filter support structure sandwiched between said fine mesh cloth and said upper surface; and spacing rings surrounding said shaft intermediate said filter elements and each having an inner diameter dimensioned to ceteringly receive said stepped collar of the respectively superjacent support; each of said openings being of a larger height than the thickness of each of said filter material.

2. A combination as defined in claim 1, wherein said support plate is of metal.

3. A combination as defined in claim 1, wherein said support plate is of synthetic plastic material.

4. A combination as defined in claim 1, wherein said spacing rings have unobstructed center openings.

5. A combination as defined in claim 1, and further comprising means for preventing relative rotation of said shaft and filter elements.

* * * * *